(12) United States Patent
Wendl et al.

(10) Patent No.: US 6,722,459 B1
(45) Date of Patent: Apr. 20, 2004

(54) AXLE HAVING A BRIDGE ARRANGED UNDERNEATH THE WHEEL AXLE

(75) Inventors: Harald Wendl, Vilshofen (DE); Michael Roske, Friedrichshafen (DE); Max Bachmann, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 42 days.

(21) Appl. No.: 10/030,720

(22) PCT Filed: Jul. 7, 2000

(86) PCT No.: PCT/EP00/06481
§ 371 (c)(1),
(2), (4) Date: Jan. 10, 2002

(87) PCT Pub. No.: WO01/03963
PCT Pub. Date: Jan. 18, 2001

(30) Foreign Application Priority Data

Jul. 13, 1999 (DE) ......................................... 199 32 586

(51) Int. Cl.[7] ................................................. B60K 7/00
(52) U.S. Cl. ..................................................... 180/65.5
(58) Field of Search ................. 180/252, 253, 180/65.1, 65.5, 65.6, 65.7

(56) References Cited

U.S. PATENT DOCUMENTS

| | | | | |
|---|---|---|---|---|
| 1,207,658 A | * | 12/1916 | Swain ........................ | 180/65.6 |
| 1,713,084 A | * | 5/1929 | Klinkman ................... | 180/65.6 |
| 3,347,333 A | * | 10/1967 | Edwards ..................... | 180/65.6 |
| 5,087,229 A | * | 2/1992 | Hewko et al. .............. | 180/65.5 |
| 5,161,813 A | | 11/1992 | Yamashita et al. .......... | 280/96 |
| 5,509,497 A | | 4/1996 | Smith .......................... | 180/308 |
| 6,006,870 A | * | 12/1999 | Gazyakan et al. .......... | 180/65.6 |
| 6,113,119 A | * | 9/2000 | Laurent et al. .............. | 180/65.5 |
| 6,328,123 B1 | * | 12/2001 | Niemann et al. ........... | 180/65.5 |

FOREIGN PATENT DOCUMENTS

| | | | |
|---|---|---|---|
| DE | 1 227 783 | 10/1966 | ............ B60K/1/01 |
| DE | 1 930 501 | 1/1971 | |
| DE | 71 21 412 | 3/1972 | |
| DE | 39 24 817 A1 | 1/1991 | ............ B60K/1/00 |
| DE | 195 01 512 A1 | 10/1995 | ............ B60K/7/00 |
| DE | 295 18 401 U1 | 4/1997 | ............ B60K/7/00 |
| DE | 295 18 402 U1 | 4/1997 | ............ B60K/7/00 |
| DE | 197 09 579 A1 | 9/1998 | ............ B60K/7/00 |
| DE | 197 09 577 A1 | 10/1998 | ............ B60K/7/00 |
| DE | 197 16 538 A1 | 10/1998 | ............ B60K/17/14 |
| DE | 296 11 867 U1 | 10/1998 | ............ B60K/7/00 |
| EP | 0 509 221 A2 | 10/1992 | ............ B60K/17/14 |
| GB | 149849 | * 8/1920 | ............... 180/65.6 |
| GB | 1347192 | * 2/1974 | ............... 180/65.5 |
| WO | 98/40235 | 9/1998 | ............ B60K/7/00 |

* cited by examiner

Primary Examiner—Frank Vanaman
(74) Attorney, Agent, or Firm—Davis & Bujold PLLC

(57) ABSTRACT

An axle, preferably for driving a low-platform omnibus, has a bridge (15) arranged at a distance from the wheel axle. The housing (14) of a driving engine (1) is connected with the bridge (15) and with suspension elements (19), on one side of the axle, to secure the axle to the vehicle and, on the other side, with a hub carrier (8) to receive forces of the wheel. The driving engine (1) has a sufficient axial distance from the wheel axle so as to create a space, in a direction opposite to the axial distance, so that a disk brake (11) and portion of the actuation device (12) of the disk brake (11) can be located within the wheel rim.

13 Claims, 4 Drawing Sheets

AXLE HAVING A BRIDGE ARRANGED UNDERNEATH THE WHEEL AXLE

The invention concerns an axle having a bridge arranged underneath the wheel axle such as used in low-platform omnibuses. To obtain the deepest possible entrance in the omnibus, the bridge of the axle is situated deeper compared to the wheel axle. To be able to implement flexible driving drafts, it is advantageous to actuate each driven wheel via a driving engine located on the wheel. The width of said drive system determines the gear width in the omnibus which must not exceed a minimum width. It is, therefore needed to lodge a majority of the wheel drive, the same as the brake of the wheel, within the rim of the wheel.

German Patent No. 1,227,783 has disclosed an axle with a wheel drive where an electric motor is used as a driving engine which drives coaxially an inner central wheel of a first planetary step, the web of which drives an inner central wheel of a second planetary step, the web of which is connected with the wheel. A drum brake, situated coaxially around the electric motor, has been disclosed as a brake. The wheel forces are transmitted, via the housing of the electric motor, to a supporting part of the axle bridge in which the electric motor is inserted. The fact of the housing of the electric motor is inserted in the supporting part of the axle bridge and non-turnably connected therewith creates the possibility of wear of the connection fit between the housing of the electric motor and the supporting part, as a consequence of high force action due to the wheel force or contact corrosion of the fit. Besides, the use of a disk brake, instead of a drum brake, within the rim is not possible since there is no space for the actuation device of the disk brake within the rim. The disk brake, when used in said driving system, would considerably lengthen and result in a small gear width for the omnibus.

German Utility Model DE 295 18 401 U1 discloses an axle where a wheel is driven via an electric motor, the electric motor is located in the axle bridge. The axle bridge is situated underneath the wheel axle. But since the electric motor is located in the axle bridge, the axle bridge needs a sufficient total height in the area of the electric motor in order to accommodate the electric motor, and this has a disadvantageous effect upon the entrance height of the omnibus.

WO 98/40235 disclosed a driving system, specifically for omnibuses, in which each wheel of an axle is driven by at least one electric motor. The guide rods and spring carriers are connected with the axle bridge, and the axle bridge having a gantry distance. The driving engine is placed entirely outside the wheel rim whereby the driving system needs a considerable installation space.

The problem on which this invention is based is to provide an axle, especially for low-platform omnibuses, in which each wheel is driven by a driving engine, the wheel is decelerated via a disk brake and the axle configured so that the wheel drive can be mostly lodged in the rim, and the axle bridge needs only a small height in order to obtain the greatest possible gear width and a low entrance for the low-platform omnibus.

The problem is solved by an axle according to the preamble of the main claim and including the characteristic features thereof.

According to the invention the axle consists of a bridge arranged underneath the wheel axle and driving wheel respectively driven by a driving engine, preferably an electric motor or hydraulic motor. A disk brake, actuated by an actuation device, is located mostly within the wheel rim. The driving engine has an axle offset relative to the wheel axle whereby a space results, opposite to the axle offset, in which the brake and the actuation device thereof can be installed between the rim and the driving engine. The axle offset of the driving engine, relative to the wheel axle, is preferably designed downwards but can also be designed in, or opposite to, the driving direction whereby the position of the actuation device of the brake also moves. To provide the largest possible center distance, a reduction gear is preferably selected in which the driving wheel, which is driven by the driving engine, meshes via an intermediate wheel with one driving the ring gear. But the center distance can also be implemented via other reduction gears. The ring gear is preferably connected with the output via one other planetary step. By the fact that in the first reduction gear the gearwheel actuated by the driving engine meshes with the ring gear, a largest possible center distance is obtained and by the fact that the gearwheel actuated by the driving engine meshes in addition with one or two other intermediate wheels, the first reduction gear can be designed very compact since the torque produced by the driving engine is distributed among several tooth engagements. The housing of the driving engine is non-rotatably connected, on one side, with the hub carrier of the axle which absorbs the wheel forces and, on the other side, the housing of the driving engine has fastening means on which the axle bridge can be mounted, the same as suspension elements of the axle and guide rods. The suspension elements of the axle and the housing of the driving engine can also be designed as one piece. By the housing of the electric motor absorbing the wheel forces and relaying them via the suspension elements and guide rods, the same as the axle bridge, it is possible to select the axle offset of the driving engine relative to the wheel axle large enough to make it possible to install the disk brake, the same as a large part of the actuation device of the disk brake, within the wheel rim. Since the first reduction gear can be designed very compact, it is possible to place one part of the driving engine within the rim whereby a very compact driving system and a large gear width can be implemented for the omnibus. The housing of the electric motor transmits all the wheel forces. Thereby the axle bridge must not be connected directly with the wheel hub whereby the weight of the wheel drive is reduced and, due to the reduction of the masses without springs, an improvement of the driving behavior and a saving of the road cover occur. By the axle bridge not surrounding the housing of the driving engine and being directly connected with the wheel hub, it is possible to configure the housing of the drive engine so that the engine can be cooled by internal and external air ducts and the mounting of the energy supply for the driving engine be freely selected. The axle bridge is preferably designed as a rectangular section whereby a small height of the axle bridge results making a low entrance in the omnibus possible. Lower inclined guide rods are mounted on the axle bridge which can be flexibly fastened to the axle bridge by a welded plate. The plate can also be designed so as to be screwable on or cast on. By the wheel drive having two reduction gears available, which are preferably designed with helical cut teeth, it is possible to use a very compact driving engine of small construction length and diameter. By using helical-cut reduction gears, a silent driving is provided.

BRIEF DESCRIPTION OF THE DRAWINGS

The invention will now be described, by way of example, with reference to the accompanying drawings in which.

DETAILED DESCRIPTION OF THE INVENTION

Figure 1:
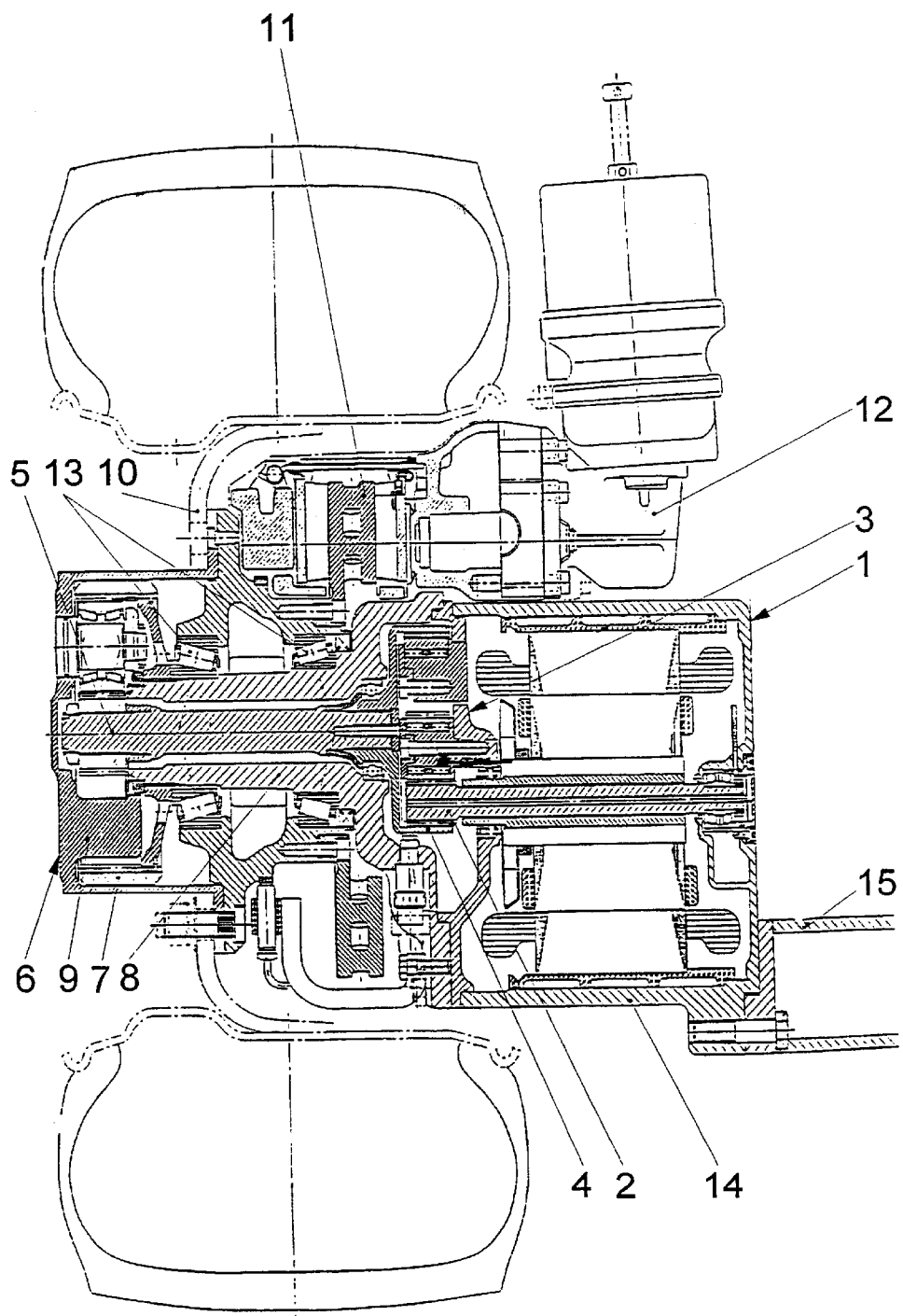
FIG. 1 is a section through an axle having an electrically driven wheel drive.
Figure 2:
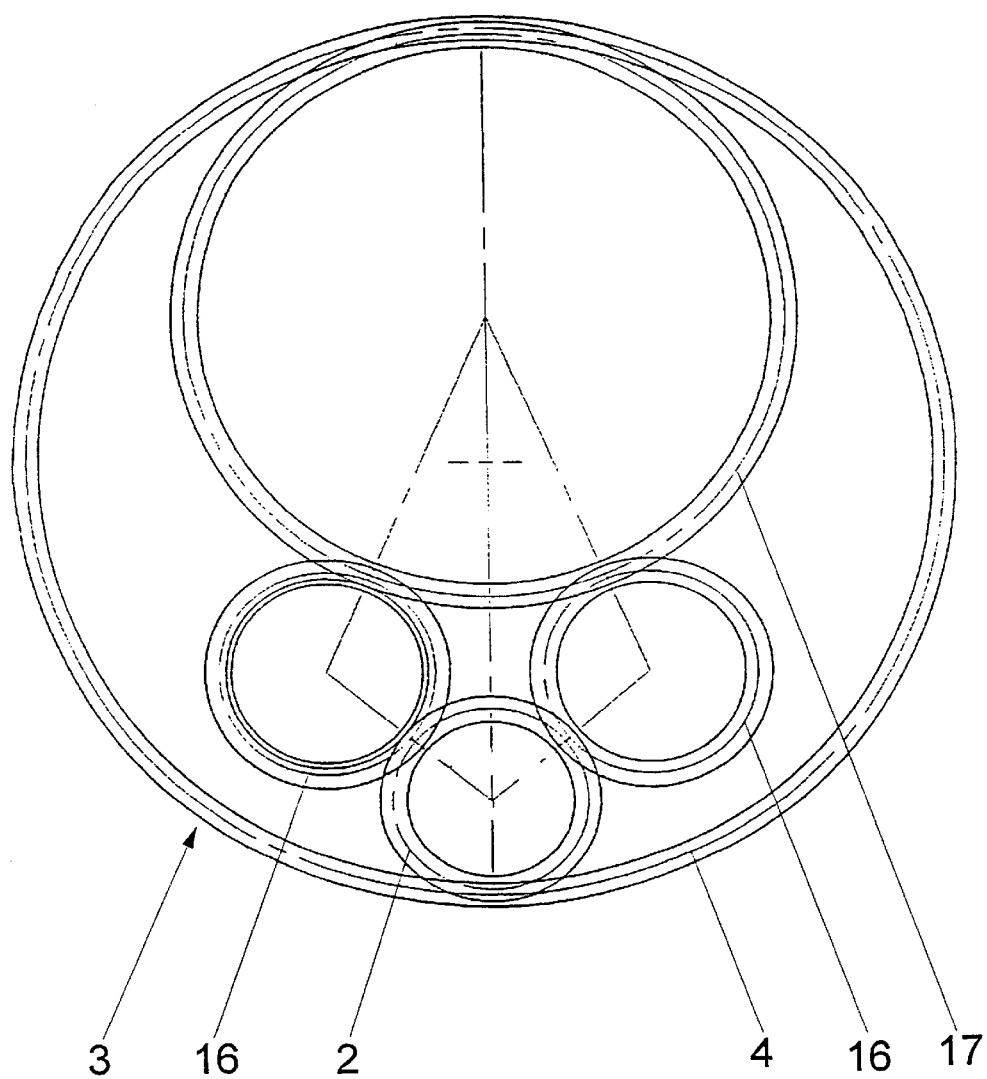
FIG. 2 is a diagram of the first reduction gear.
Figure 3:
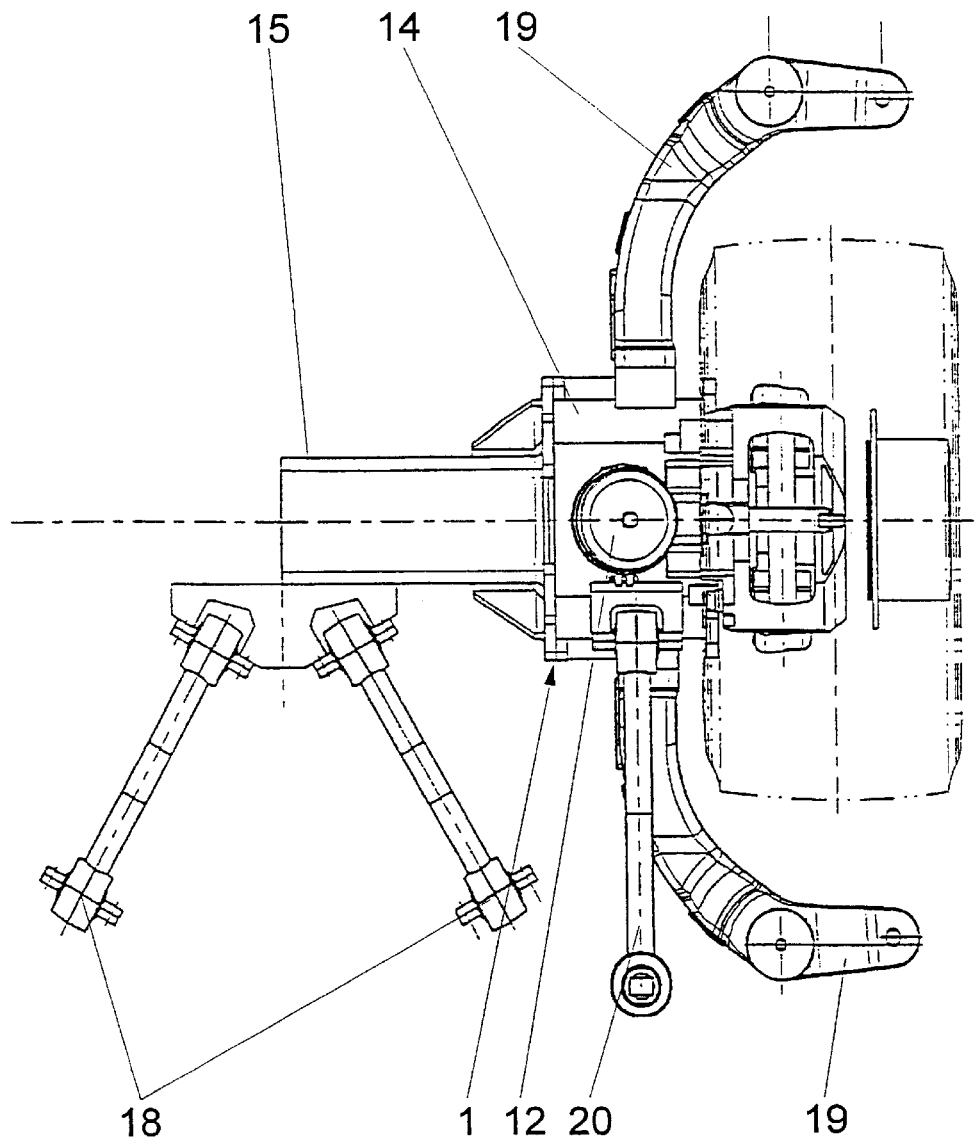
FIG. 3 is the topview of an axle with suspension elements of the axle and the guide rods thereof.
Figure 4:
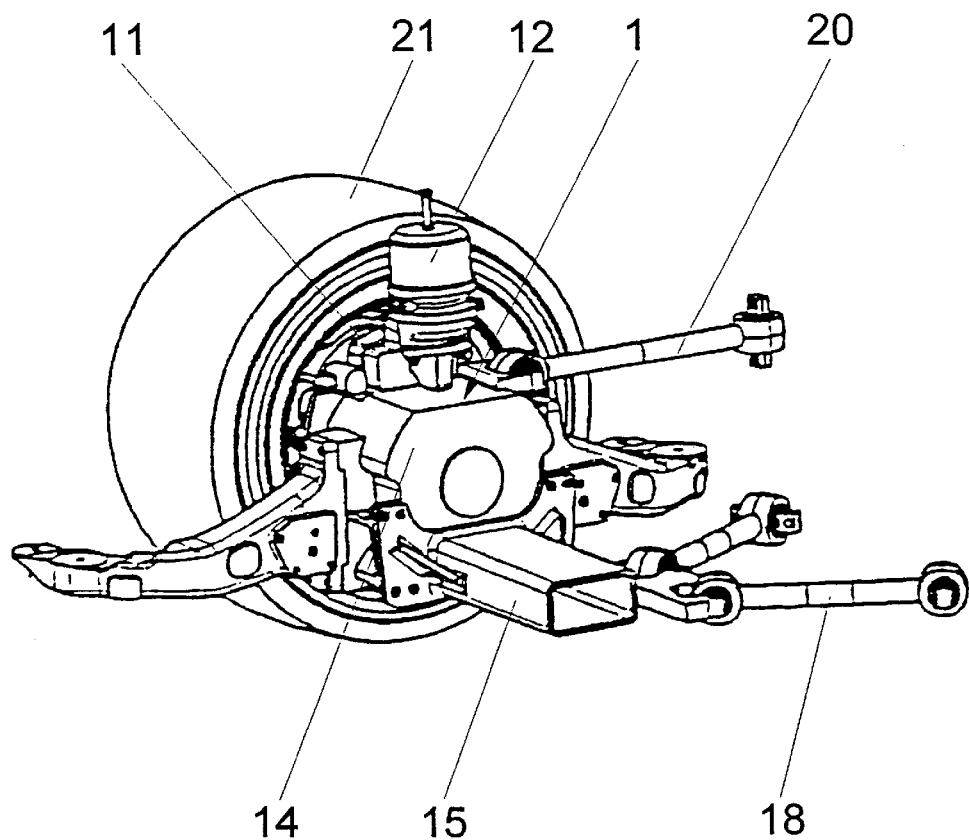
FIG. 4 is a perspective representation of the axle with bridge and suspension elements, and guide rods.

FIG. 1:

An electrically actuated driving engine 1 drives a first reduction gear 3 via a drive wheel 2. The ring gear 4 of the first reduction gear 3 drives an inner central wheel 5 of a second reduction gear 6. The second reduction gear 6 is designed as a planetary transmission where the ring gear 7 is non-turnably connected with the hub carrier 8 and the planet carrier 9 thereof forms the output and is non-turnably connected with a rim 10. The driving engine 1 has an axle offset from the wheel axle. By virtue of the axle offset of the driving engine 1, a space results between the driving engine 1 and the rim 10 where a disk brake and a majority of the actuation device 12 of the disk brake 11 are installed. The actuation cylinder of the actuation device 12 is situated almost at right angles relative to the wheel axle whereby the actuation cylinder can be disposed stationarily or horizontally in order to keep the total length of the driving system short. The driving engine 1 is firmly connected, via fastening means, with the hub carrier 8 which absorbs wheel forces via the bearing 13. By the housing 14 of the driving engine 1 being connected with the hub carrier 8, on one side, and, on the other side, with an axle bridge 15, the driving engine 1 can be moved up, relative to the rim 10, to a small safety distance so that a maximum axle distance from the wheel axle results. The axle bridge 15 and the housing 14 can also be designed as one piece.

FIG. 2:

The driving wheel 2 of the first reduction gear 3 meshes with the ring gear 4, on one side, and with two intermediate wheels 16, on the other side, which, in turn, are connected with an intermediate wheel 17 with the ring gear 4. By the fact that the torque of the driving engine 1 is distributed in the drive wheel 2 over three places, the first reduction gear 3 can be designed compact. Instead of the intermediate wheels 16, it is possible to arrange only one intermediate wheel with the torque being thereby distributed over two places.

FIG. 3:

Two inclined guide rods 18 are connected with the axle bridge 15. The inclined guide rods 18 can be connected to the axle bridge 15 by means of a welded connecting plate. The connecting plate can also be connected or screwed on. Suspension elements 19 are mounted to the housing 14 of the driving engine 1 which connect the axle with the vehicle via a spring damping device, not shown. The suspension elements 19 are preferably designed as C-shaped brackets and can be screwed or welded to the housing 14, or be designed integrally with the housing 14. A longitudinal guide rod 20 is mounted on the housing 14 above the suspension elements 19, it being possible to design the connection thereof either screwed to or integral with the housing 14. The longitudinal guide rod 20 can also be disposed underneath and the inclined guide rods 18 above.

FIG. 4:

The axle bridge 15, which is connected with the housing 14 of the driving engine 1 or designed integrally with the housing 14, is preferably constructed as a rectangular section. The actuation device 12 of the disk brake 11 is designed so that a radial extension of a tire 21 is only insignificantly overlapped whereby a wheel well of the omnibus, not shown, does not have to be specially formed out. If the axle is not designed as a rigid axle, the housing 14 of the driving engine 1 can also contain the support of the swivel bearing by which a steering angle can result.

| Reference numerals | |
|---|---|
| 1 driving engine | 12 actuation device |
| 2 drive wheel | 13 bearing |
| 3 first reduction gear | 14 housing |
| 4 ring gear | 15 axle bridge |
| 5 inner central wheel] | 16 intermediate wheel |
| 6 second reduction gear | 17 intermediate wheel |
| 7 ring gear | 18 inclines guide rod |
| 8 hub carrier | 19 suspension elements |
| 9 planet carrier | 20 longitudinal guide rod |
| 10 rim | 21 tire |
| 11 disk brake | |

What is claimed is:

1. A vehicle wheel having a bridge (15) arranged beneath a wheel axle of the vehicle wheel, a drive engine (1) driving the wheel axle via at least one reduction gear (3), a housing (14) supporting the driving engine (1), the wheel axle driving a rim (10) of the vehicle wheel equipped with a brake (11), and the brake (11) facilitating braking of the rim when the brake is actuated;

wherein the brake (11) is a disk brake which is substantially accommodated within the rim (10) and a gear wheel (2) of the driving engine (1) is spaced from the wheel axle;

the at least one reduction gear (3) comprises a gear wheel (2) driven by the driving engine (1), the gear wheel (2) meshes directly with a ring gear (4) and also meshes with at least one intermediate gear wheel (16) which, in turn, drivingly meshes with one additional intermediate gear wheel (17), the one additional intermediate gear wheel (17) meshes with the ring gear (4) to supply additional drive to the ring gear (4), and the ring gear (4) supplies a drive output from the at least one reduction gear (3) to the rim;

the housing (14) for the driving engine (1) has suspension elements for securing the wheel axle to a vehicle, and the housing (14) couples the rim (10) with the axle bridge (15).

2. The vehicle wheel according to claim 1, wherein the bridge (15) has a rectangular cross section.

3. The vehicle wheel according to claim 1, wherein an actuation device (12) for the disk brake (11) only has an insignificant overlap, in a radial direction, with a tire (21) supported by the rim (10).

4. The vehicle wheel according to claim 1, wherein the suspension elements (19) are C-shaped brackets which encompass a tire (21) supported by the rim (10).

5. The vehicle wheel according to claim 1, wherein the gear wheel (2) meshes with two intermediate wheels (16) which each mesh with the additional intermediate wheel (17) to supply additional drive to the ring gear (4) of the at least one reduction gear (3).

6. The vehicle wheel according to claim 1, wherein the ring gear (4) of a rotational axis of the ring gear (4) is concentric with the wheel axle (5) of the vehicle wheel while a rotational axis of the gear wheel (2) is offset with respect to the rotational axis of the wheel axle (5).

7. The vehicle wheel according to claim 1, wherein the ring gear (4) of the at least one reduction gear (3) drives a second reduction gear (6) and an output of the second reduction gear (6) drives the rim (10).

8. The vehicle wheel according to claim 7, wherein the second reduction gear (6) is a planetary drive and the ring gear (4) of the at least one reduction gear (3) drives a sun gear of the second reduction gear (6) while a planetary gear of the second reduction gear (6) drives the rim (10).

9. A wheel axle having a bridge (15) arranged beneath the wheel axle, a rim (10) driven by a driving engine (1) via at least one reduction gear (3), the driving engine (1) having a housing (14), and the rim (10) having one brake (11) connected therewith;

wherein a drive axle of the driving engine (1) is spaced from the wheel axle, and the brake (11) is a disk brake which is mostly located within the associated drive wheel;

the at least one reduction gear (3) comprises a drive wheel (2) of the driving engine (1) which meshes with a ring gear (4) which forms an output of the at least one reduction gear (3), the drive wheel (2) additionally meshes with at least one intermediate wheel (16) which drives, via an additional intermediate wheel (17), the ring gear (4), and the housing (14) of the driving engine is connected with the axle bridge (15) and has suspension elements for securing the wheel axle to a vehicle; and the housing (14) is connected to a vehicle by a longitudinal guide rod (20) and the bridge (15) is connected to the vehicle by inclined guide rods (18).

10. The axle having a bridge (15) arranged beneath the wheel axle according to claim 9, wherein the bridge (15) has a rectangular cross section.

11. The axle having a bridge (15) arranged beneath the wheel axle according to claim 9, wherein an actuation device (12) for the disk brake (11) only has an insignificant overlap, in a radial direction, with a tire (21) supported by the rim (10).

12. The axle having a bridge (15) arranged beneath the wheel axle according to claim 9, wherein the suspension elements (19) are substantially C-shaped brackets and encompass a tire (21).

13. The axle having a bridge (15) arranged beneath the wheel axle according to claim 9, wherein the drive wheel (2) meshes with two intermediate wheels (16) which each drive, via the additional intermediate wheel (17), the ring gear (4).

* * * * *